Sept. 6, 1960

W. JUDA ET AL
ION EXCHANGE MATERIALS AND METHOD
OF MAKING AND USING THE SAME
Original Filed July 9, 1949

Re. 24,865

Inventors
Walter Juda
Wayne A. McRae
by Robert Cushman & Grover
Att'ys.

United States Patent Office

Re. 24,865
Reissued Sept. 6, 1960

24,865

ION EXCHANGE MATERIALS AND METHOD OF MAKING AND USING THE SAME

Walter Juda and Wayne A. McRae, Lexington, Mass., assignors, by mesne assignments, to Ionics Incorporated, Cambridge, Mass., a corporation of Massachusetts Original No. 2,636,851, dated Apr. 28, 1953, Ser. No. 103,784, July 9, 1949. Application for reissue Sept. 3, 1959, Ser. No. 824,146

72 Claims. (Cl. 204—98)

Matter enclosed in heavy brackets [ ] appears in the original patent but forms no part of this reissue specification; matter printed in italics indicates the additions made by reissue.

This invention relates to ion-exchange materials, and to methods of procedure for preparing and applying the same.

In prior physico-chemical investigations, electronegative collodion or nitrocellulose membranes, capable of barring mobile anions, and electropositive membranes, for example, protamine impregnated collodion membranes, capable of barring mobile cations, have been used to separate two solutions of electrolytes for the purpose of studying the selective transfer of ions therethrough.

However, the most effective membranes of this type, to approach the thermodynamic characteristic concentration potential of 55.1 millivolts, are poor conductors of electricity, having conductivities, as measured in 0.1 M KCl solution, of less than $1.5\times10^{-4}$ ohm$^{-1}$ per cm. This potential is determined at 25° C. in the system:

| | | | | | | |
|---|---|---|---|---|---|---|
| calomel electrode | saturated KCl solution diffusion protected | 0.1 M KCl solution | membrane | 0.01 M KCl solution | saturated KCl solution diffusion protected | calomel electrode |

The poor conductivity of such membranes necessitates the use of thin and structurally weak membranes of not more than .030 to .050 mm. thickness, in order to effect the transfer of ions therethrough.

These collodion membranes have been examined and tested, and both types of such membranes exhibit only very weak base exchange and anion exchange properties, respectively. Moreover, even the most effective of these membranes have low total acid numbers ranging from 1 to 3.3 (as titrated in a solution of the prepared collodion in an organic solvent with alcoholic potassium hydroxide) corresponding to 0.01 to 0.033 milliequivalent of acid per gram of dry collodion. Of this amount of total acid, only a fraction of one per cent is available for base exchange. This large discrepancy between the total acid and exchange capacity accounts for the very weakly acid character of collodion membranes, which is due to the preponderance of acid groups having very low dissociation constants. Similarly, the protamine type of impregnated electropositive collodion membranes are only weakly basic.

Ion-exchange materials have been made of organic resins, but these have been produced solely in the conventional form of beads or granules of small particle size, averaging usually considerably below ⅛" in diameter, or in respect of the largest dimension of each particle. These small granular exchangers have been and could therefore only be used in systems in which they were either contacted with the solution until equilibrium was reached or the solution was percolated through a stationary bed of the exchanger granules. In this case, ion exchange necessarily consisted merely of the transfer of ions from the solution onto the resin and from the resin back into the same solution. Hence, in order to exchange ions between two different solutions, it was necessary to first exhaust the capacity of the exchanger by means of a first solution and then regenerate the exchanger by contacting it with a second solution. This method of operating cation exchangers has the disadvantage of being non-continuous and uneconomical in that it requires substantial exhaustion of the exchange materials in each half of the cycle.

It is an object of this invention to provide ion-exchange materials, in the form of coherent, uniform, permselective structures of increased electrical conductivities, of substantial ion exchange capacities and of strongly acid and/or strongly basic and/or substantially dissociated salt characteristics. It is a further object to prepare such ion-exchange materials, in an integral, uniform solid, unfractured structure and with substantial cross-sectional dimensions or areas—greater, for example, than those of beads or granules—and at least one quarter inch or more in at least one dimension. It is also an object of the invention to provide a method of preparing such permselective coherent structures and of applying the same to the useful arts. Other objects of the invention will appear from the following disclosure.

It is found by the present invention that ion-exchange materials may be made which are not only more effective in their function of effecting ion-exchange but which may also acquire the novel additional function of effecting both ion-exchange and ion-regeneration, progressively and simultaneously—and hence continuously—so long as a difference of ion characteristics or ion concentration is maintained across or through the ion-exchange material or medium.

A criterion for these additional functions is that the ion-exchange material shall be comprised in a coherent and relatively uniform structure, containing water in an amount at least 15% by weight of the dry exchange material, and also contain (or consist of) in integrated association therewith, an ion-exchange component which is substantially insoluble in water but which is freely dissociable therein, the ion-exchange component being oriented with respect to its dissociable ions so as to present a predominant proportion or amount of the same in the exposed surfaces of the structure or interface between the ion-exchange material and the aqueous-filled voids. The ion-exchange component is preferably substantially water insoluble and characterized by having one of its ions, upon dissociation, remain integral with and fixed to the coherent polymeric matrix of the ion-exchange material, while the other ion, upon dissociation, is released as a mobile, active ion, into the aqueous filled voids of the ion-exchange material or medium. That is to say, in general the structures of this invention comprise, as an essential part extending substantially throughout, a predominant amount of an ion-exchange resin which resin may be defined as an insoluble, infusible, synthetic organic polymeric matrix having dissociable ionic groups chemically bonded thereto and having water in gel relationship therewith. An important feature of the structures of this invention is the presence of the gel water in an amount of at least 15% of the weight of the dry ion-exchange resin, whereby this structure is rendered highly conductive electrically.

The membrane or diaphragm which is thus formed by the ion-exchange material or medium of the present invention is therefore typically of a coherent, uniform, conductive permselective structure, such as a continuous gel, in contrast to impermeable or non-conductive films or membranes or non-uniform, gelatinous precipitates or granular exchange materials of the prior art.

The permselective structure of the present invention may comprise or be composed of a binder material, with which the ion-exchange material is integrally associated, the ionic groups of the ion-exchange material being in oriented, dissociable relation with respect thereto and to the aqueous phase of the structure. The permselective structure of the invention may be composed of polymerized organic segments which are chemically combined with each other to constitute a coherent uniform structure, but which are also chemically combined with and form a part of the molecules of the ion-exchange component, per se. More particularly, the polymerized component is combined with the fixed ion of the ion-exchange component, which is oriented with respect to the polymerized component so as to be predominantly in the outer surface of the structure. Upon dissociation of the ion-exchange component, the fixed ion remains in the solid exposed surface of the structure, while the other ion becomes a mobile active ion, liberated in the aqueous filled voids.

A representative and preferred procedure for the preparation of such ion-exchange diaphragms of the present invention is to dissolve or disperse appropriate polymerizable organic compounds, in water, and then to effect polymerization, and especially curing to the water-insoluble stage, and preferably to the final stage of curing which is to be effected, of the thus dispersed reagents, in the aqueous medium as by heat, pressure, and the like (without segregation or evaporation), whereupon the resulting polymer is constrained to cure to an integrated gel formation, throughout the dispersion, thereby to constitute a coherent structure, membrane or diaphragm of a shape and dimensions corresponding to those of the dispersion in which such curing takes place.

In such dispersion, polymerization and curing—if the polymerizing reagent materials possess or form a dissociable component—it is found that the aqueous dispersion effects and maintains the orientation of such component outwardly from the polymerizing and curing components toward and into the aqueous or dispersing phase, and that the polymerizing components tend to aggregate into and form a homogeneous continuous, solid, and ultimately coherent phase, occluding the aqueous phase.

Moreover by maintaining the liquid aqueous dispersing phase present and effective throughout the polymerization—without evaporation and without segregation—the cured polymer acquires and retains a gel structure—characterized by an extensive interface between the cured polymeric structure and the gel water—in the interfaces of which the dispersed, oriented, dissociable components are concentrated, and maintained subject to dissociation into a fixed ion therein, and a mobile active ion, which is free to migrate into and throughout the aqueous phase or gel water.

It is found that in order to effect and preserve these relationships and the free permeability of the solidified gel structure, throughout, the aqueous medium should form at least 15%, by weight, of the weight of the dry ion-exchange component, and should not at any time be allowed to become less, as by drying, etc., lest the continuous coherent structure of the whole should be disrupted or its exposed electric or surface characteristics and ion-exchange function be interfered with or destroyed.

The formation of organic polymers under the usual conditions of curing, of the prior art—wherein media are used other than water, or from which water, if present, is allowed to segregate or escape—does not permit orientation of the components or result in a continuous permselective structure, but in one which is subject to firm impervious solidification and even fracture (non-aqueous resinous beads) upon shrinkage, or otherwise. Either a continuous ion-impermeable structure or a fractured structure would be unsuitable for thet purpose of the present invention.

By the present procedure, the ion-exchange resin, whether it constitutes a chemical component of the polymerized structure, or is physically associated therewith, is incorporated integrally and simultaneously with the initial curing of the structure with its dissociable component directed to and into the aqueous phase of the dispersion and of the resulting gel.

It has now been found, for example, that solid, physically stable structures, including membranes, diaphragms, sheets, rods, tubes, vessels and objects of many different shapes (having at least one and more particularly at least two dimensions greater than ¼″) can be prepared presenting water-insoluble, coherent, ion-exchange materials of high specific conductivities. According to this invention such ion-exchange materials are of high specific conductivities, exceeding $.5\times10^{-2}$ $ohm^{-1}\times cm.^{-1}$ and of high capacities, and contain substantial amounts of dispersed water, not less than 15% of the weight of the air dry exchanger material and up to such proportions as might mechanically interfere with its uniform, coherent or permselective characteristics.

Such coherent structures may generally be made by casting, molding (including compression molding, if without substantial loss or segregation of the water component) and other conventional means of providing large continuous coherent structures of thermosetting or thermoplastic resins, except that the structures of this invention are made and maintained in aqueous media and/or an atmosphere of substantially saturated humidity, so as to prevent evaporation. In this manner the active groups attached to the polymeric organic matrix and oriented with respect to the interfaces thereof are partially or completely dissociable in the internal gel water into fixed ions of one sign linked to the polymer and into mobile ions of opposite sign. The latter are exchangeable ions and the main or substantially sole carriers of electric current.

In order to obtain the above high conductivities with active groups of relatively low dissociation constants between $10^{-5}$ and $10^{-3}$, when measured in the form of one resin-forming ingredient in aqueous solution prior to condensation or polymerization, it is necessary to provide a high density of such groups, that is, unusually high exchange capacities, exceeding 3 milliequivalents (m. eq./gram) per gram of dry exchanger. On the other hand, in the case of ion-exchangers having the preferred strongly dissociated active groups (i.e. having a dissociation constant above $10^{-3}$) smaller exchange capacities, of not less than 0.3 milliequivalent per gram of dry exchanger have now been found to be entirely adequate to give the above conductivities.

It has further been found that the preferred coherent resinous materials containing at least 15% of internal gel water and having an exchange capacity exceeding 0.3 milliequivalent per gram of dry exchanger, said capacity being substantially due to active acid and/or basic and/or salt groups having a dissociation constant greater than $10^{-3}$ undergo electrolysis when subjected to direct currents in a sufficiently strong electric field, as evidenced by the appearance of electrolysis products at the electrodes. To give a simplified picture of this novel type of electrolysis, it is believed that the mobile ions carry the primary portion of the current and that they are presumably discharged at the electrode, whereas the fixed ions of opposite sign presumably decompose some of the gel water thereby producing an equivalent amount of secondary mobile ions which discharge on the other electrode. These preferred materials capable of undergoing electrolysis may therefore be designated as solid, coherent synthetic resinous permselective ion-exchange electrolytes, of strongly acid or strongly basic or substantially dissociated salt character.

Suitable active acidic functional groups linked to a polymeric matrix include $—SO_3H$, —COOH and the like, —$SO_3H$ being preferred because of its high dissociation constant exceeding $10^{-3}$ in suitable resin-forming compounds. The exchangeable hydrogen ion may be partially or completely substituted by other substantially dissociated cations such as the alkali metal ions, the alkaline earth metal ions—namely, calcium, strontium, barium and radium—and also silver, copper, magnesium and ammonium ions, and the like. Typical polymeric matrices to which the functional groups are linked include phenolaldehyde resins; polystyrene-divinylbenzene copolymers and the like. Similarly suitable active basic groups linked to polymeric matrices include quaternary ammonium hydroxides—

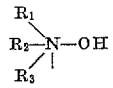

amino groups, the guanidyl group,

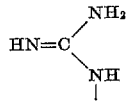

the dicyandiamidine group

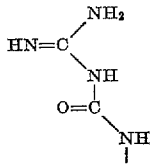

and the like organic nitrogen containing basic groups.

Quaternary ammonium hydroxide groups, the guanidine and the dicyandiamidine residue are among the preferred basic groups because of their high dissociation constant exceeding $10^{-3}$. Typical polymers to which active basic groups are linked include the urea-formaldehyde type resins, the melamine-formaldehyde type resins, the polyalkylene - polyamine - formaldehyde resins and the like. The exchangeable hydroxyl ions may be partially or completely substituted by other substantially dissociated anions such as $Cl^-$, $NO_3^-$, $SO_4^{--}$, and the like.

The permselective character of the coherent ion-exchange structure of this invention, and more particularly of the coherent ion-exchange electrolytes is shown by the observation that they have either a characteristic concentration potential of the order of 55 millivolts when measured in a concentration cell by means of the calomel electrode system previously described, or an appropriately modified concentration potential measured by means of a different thermodynamic system, such as silver-silver chloride electrodes immersed in two different solutions without salt bridge. It has further been discovered that their high conductivities and their physical stability make possible a great variety of novel applications in which diaphragms comprising coherent ion-exchange electrolytes are used as a barrier to separate two or more solutions of electrolytes, for example, for the purpose of transferring ions of one sign at the substantial exclusion of ions of the opposite sign. Such systems comprising ion-exchange electrolyte diaphragms separating at least two solutions of electrolytes may either be used as such in a variety of applications relying primarily on their ion-exchange properties or they may be used in electrolytic cells. More particularly we prepare and use solid diaphragms comprising solid ion-exchange electrolytes and we separate by means of these diaphragms and ion-permeable membranes two solutions containing either at least two different concentrations of the same species of ions; or at least two different species of ions, thereby effecting exchange of ions of one charge between two solutions at the substantial exclusion of exchange of ions of the opposite charge, and/or exchange of small ions with the substantial exclusion of exchange of large ions. We may enhance the effectiveness and the rates of such exclusive exchanges by applying electric fields across the two solutions separated by ion-exchange diaphragms.

Further, we use coherent ion-exchange diaphragms of high conductivity and permselective membranes in the construction of primary and secondary (storage) electromotive force cells in which the diaphragm or membrane separates two solutions of different electrochemical potential.

Representative examples of the specific preparation and applications of the ion exchange medium or materials, in accordance with the invention, will be described, reference being had to the accompanying drawings, in which.

Figure 3:
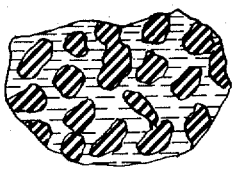
Figure 4:
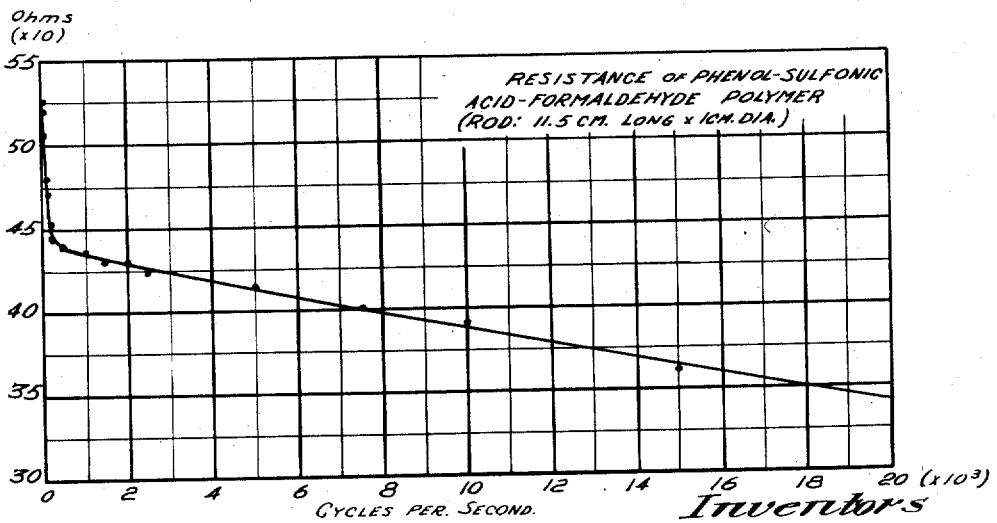

Fig. 3 is a visualized detail cross-section of a submicroscopic portion of the ion-exchange medium illustrative of the coherent solid structure thereof and of the intervening continuous gel water dispersed therethrough and occluded therein, which are of the order of molecular dimensions; and Fig. 4 is a graph representing the variation in effective resistance of an ion-exchange medium of this invention with respect to alternating electric current of differing frequencies.

EXAMPLE 1

Preparation of membranes of phenol sulfonic acid-formaldehyde

The impregnating, low molecular weight polymer was prepared as follows:

| | Parts by weight |
|---|---|
| Aqueous phenol sulfonic acid (65%) | 50 |
| Aqueous formaldehyde (35.4%) | 24.7 |

The acid and the formaldehyde are shaken together and partially polymerized at 50° C. in a closed container (to retain the moisture and formaldehyde). This precuring requires 1½ to 2 hours after which the viscous mixture was used to impregnate reinforcing webs such as Saran, Vinyon, glass cloth, and similar materials resistant to strong acids. It was poured into a mold to form the cast disks. The curing (until the polymer turned dark brown or black) was carried out at 100° C. in a closed system and in the presence of moisture. This process required from two hours to two days depending upon the quantity and geometry of the polymerizing mass.

The special characteristics of the cured material both cast and impregnated have been entered into the appended table. Precured material was preserved in a refrigerator at 5° C. for weeks at a time with no deleterious effect.

Before using, the diaphragm was conditioned by soaking in water to bring the water content to the saturation value and thereafter maintained in wet condition throughout, for purposes of testing and use. A similar procedure was followed in all of the following examples.

In the course of measuring the conductance of the diaphragm, it was found that the specific conductivity ($1.4\times10^{-1}$ ohm$^{-1}$ cm.$^{-1}$) of the diaphragm in equilibrium with 1 N hydrochloric acid was greater than that of the 1 N hydrochloric acid ($0.36\times10^{-1}$ ohm$^{-1}$ cm.$^{-1}$) itself.

It may also be observed that in preparing the ion-exchange materials of the above and following examples (and also of organic polymeric ion-exchange materials in general, in accordance with the present invention) the time and/or temperature and other conditions of curing may be considerably extended without substantially altering the electrical and/or surface characteristics of the resin so long as the water component is maintained.

EXAMPLE 2

Preparation of molded diaphragms of "Amberlite IRC–50"

"Amberlite IRC–50" is identified by the maker as a synthetic cation-exchanger in the form of white opaque beads exhibiting the extremely high capacity of 10.0–10.2 milli-equivalents per dry gram deriving its exchange capacity form weakly acid carboxylic acid groups and was used in the preparation of a cast disk as follows:

| | Parts |
|---|---|
| Amberlite IRC–50 (containing 20% water) | 50 |
| Polystyrene *solution* (30% in benzene [solution]) | 50 |

The resin is pulverized in a hammer mill, sieved to finer than 100 mesh, made into a slurry with the polystyrene solution, transferred to the mold, and cured at 50° C. The final product, containing 20% water on the basis of the weight of wet resin, as indicated above, accordingly contained 25% water on the basis of the weight of dry resin.

In an alternate procedure, 50 parts of "Amberlite IRC–50," with about 27% moisture and finer than 100 mesh, were mixed with 50 parts of a 25% solution of polystyrene in benzene, poured into a 3.5 inch Petri dish and allowed to cure, as above.

In general, the use of electrically non-conducting inert binders for powdered resinous ion-exchangers such as the polystyrene of this example, reduces inherently the conductivity of the cast or molded products. While products containing moderate amounts of such binders may be useful for many purposes, excessive amounts (e.g. amounts exceeding 30% by weight of the dry exchange material), usually cause such an increase in electrical resistance as to render the products useless for the purposes of this invention.

Satisfactory diaphragms have also been molded using this type of binder and, for example heat (120° C.), pressure (2500 lbs./sq. in.), and thirty minute time of curing. Thus an alternative procedure, for forming structures comprising granules of an ion-exchange resin and a binder therefor, is to combine the granules (containing at least 15% water) and the binder material, and effect solidification of the binder material with the granules embedded therein, under conditions substantially preventive of the escape of water from the granules.

EXAMPLE 3

Preparation of melamine-guanidine formaldehyde diaphragms

| | Parts |
|---|---|
| Melamine | 126 |
| Guanidine carbonate | 90 |
| Aqueous formaldehyde (35.4%) | 243 |
| Aqueous hydrochloric acid (37%) | 162 |

The melamine and guanidine carbonate were combined with the acid and the formaldehyde was added to the mixture. At 110° C. the material polymerized within four minutes. A low molecular weight polymer was obtained by heating to 40° C. for about forty-five minutes. This polymer was then used to impregnate Saran and to prepare cast diaphragms. The curing conditions for the cast material were 75° C. and twelve hours in the presence of moisture. The curing of impregnated material was done at a higher temperature, 90° C., and also in the presence of moisture.

TABLE

| Material | Form | Characteristic concentration potential (millivolts) | Conductivity of structure (ohms$^{-1}$×cm.$^{-1}$) | Moisture percent of bone-dry material | Capacity (Milliequivalents per gram bone-dry material) | K ave. (order of magnitude) |
|---|---|---|---|---|---|---|
| strongly acid cation-exchanger of Example 1 | cast | +55 | $0.9–1.4 \times 10^{-1}$ | 114 | 1.5–1.7 | $7 \times 10^{-2}$ |
| | impregnated Saran | +51 | $4.5–5.5 \times 10^{-2}$ | 114 | 1.5–1.7 | $7 \times 10^{-2}$ |
| weakly acid cation-exchanger of Example 2 | cast | +29.2 | $2.5 \times 10^{-2}$ | 37 | [11.6]7 | $10^{-5}$ |
| strongly basic anion-exchanger of Example 3 | do | ---------- | $8.8 \times 10^{-2}$ | 138 | [10.5]1.0 | $3 \times 10^{-1}$ |
| | impregnated Saran | −32. | $4.5–5.5 \times 10^{-2}$ | 121 | 6.0 | $3 \times 10^{-1}$ |
| strongly acid cation-exchanger of Example 4 | cast | +16. | $3.5 \times 10^{-2}$ | 45 | 1.5–2 | $10^{-1}–10^{-2}$ |
| [strongly basic anion-exchanger of Example 5 | do | −52. | $4.7 \times 10^{-2}$ | 58 | 0.8–1.4 | $10^{-1}–10^{-2}$] |

EXAMPLE 4

Preparation of molded diaphragms of "Dowex 50"

The (strongly acid) sulphonated copolymer of styrene and divinylbenzene, which is described by W. C. Bauman and J. Eichhorn under the name of "Dowex 50" in the Journal of the American Chemical Society, volume 69, page 2830 (1947) and also by D'Alelio in U.S. Patent 2,366,007, was used in the preparation of a cast disk as follows:

The commercial resin, obtained as 100–200 mesh beads was cast into disks by means of heat and a binder. The binder used was phenolsulfonic acid formaldehyde.

| | Parts |
|---|---|
| "Dowex 50" (*calculated as* bone dry) | 100 |
| Aqueous phenolsulfonic acid (65%) | 25 |
| Aqueous formaldehyde (35.4%) | 12.5 |

The phenolsulfonic acid and formaldehyde were shaken together and added to the "Dowex 50." The resulting slurry was *transferred* [poured] into a mold and cured at 105° C. in an atmosphere saturated with water vapor.

[EXAMPLE 5

Preparation of molded diaphragms of "Amberlite IRA–400"

The anion-exchange resin, "Amberlite IRA–400," has been described by the maker as having as anion active groups quaternary ammonium hydroxide, presumably resulting from the introduction into the polymeric structure of trialkyl amines. Further it has been stated that "Amberlite IRA–400" behaves as a solid caustic with only its hydroxyl ions in solution and that its basicity is comparable to the acidity of sulphonated ion-exchange materials. Its capacity was measured and found to be 0.7–0.8 milliequivalent per gram of dry exchanger.

This commercial resin, obtained as 20–40 mesh beads was cast into disks by means of heat and a binder. The binder used was melamine-guanidine formaldehyde.

| | Parts |
|---|---|
| "Amberlite IRA–400" (containing 30% of water) | 100 |
| The low molecular weight melamine guanidine formaldehyde polymer prepared in accordance with the procedure of Example 3 | 20 |
| Water | 80 |

The binder was dissolved in the water by heating, and the resulting viscous solution added to the beads of "Amberlite IRA–400." This slurry was poured into a mold and cured at 105° C. in an atmosphere saturated with water vapor.]

EXAMPLE 6

Electrolysis in the ion-exchange medium

| | Parts |
|---|---|
| Sulfuric acid (95.5%) | 100 |
| Phenol | 79 |
| Formaldehyde (37%, in water) | 129 |

The phenol was melted and heated to 95° C., the sulfuric acid added and the mixture heated at 140° C. for two hours and then cooled to 15° C. The phenol-sulfuric acid mixture was added to the formaldehyde which had been cooled to 0° C., additional cooling being provided to keep the temperature below 20° C. The resulting mixture may be stored for weeks at 5° C.

Figure 1:
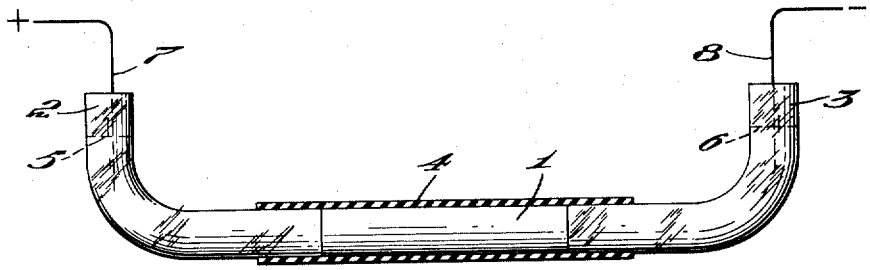
Figure 1 is an elevational diagrammatic view of an assembly of a rod of the ion-exchange material between two columns of mercury for the passage of an electric current therethrough.

The unpolymerized liquid was poured into a cylindrical glass mold and polymerized at 60° C. until dark in color. The rod was conditioned by soaking in distilled water until substantially all water-soluble reagents were removed. The resulting cation exchange rod 1 (Fig. 1), 5.2 cm. long and 1.2 cm. in diameter, was mounted between the rods of glass tubes 2, 3, in a rubber tubing 4 as shown. The glass tubes 2, 3, were filled with mercury at 5 and 6 into which were dipped platinum electrodes 7 and 8. A direct current of 4 milliamperes developed when a potential of 6 volts was imposed on the system, the current being carried ionically in the cast rod, for a constant D.C. potential varying slightly with time giving rise to an evolution of hydrogen gas at the mercury-exchanger interface adjacent to the positive terminal. Much of the oxygen combined with the mercury at the interface to give oxides of mercury. If the rod is kept wet with water, the electrolysis may be continued. Measuring the volume of evolved hydrogen at constant pressure gives a measure of the number of coulombs passed by the electrical circuit. The system may be used as a convenient coulombmeter.

Upon closing the circuit an instantaneous very high current of 0.04 ampere was observed which dropped to the steady value given above. This unusual behavior illustrates the novel nature of this type of electrolysis.

EXAMPLE 7

The novel electrical properties of cast ion-exchange materials for the measurement of frequency of an electric field

| | Parts |
|---|---|
| Sulfuric acid (95.5%) | 108 |
| Phenol | 100 |
| Formaldehyde (37%) | 130 |

The phenol and sulfuric acid were mixed together, heated at 130° C. for three hours, cooled to 15° C. and added to the formaldehyde which had been chilled to 0° C., additional cooling being provided to keep the temperature below 20° C. The mixture was a reddish-brown, oily liquid. It may be stored for weeks at 5° C. The liquid was poured into a cylindrical glass mold and polymerized at 60° C. until black in color. The resulting rod was conditioned by soaking in distilled water and then in 2 N HCl and finally was washed free from HCl with distilled water. The resistance of this water-saturated rod was measured in a direct current, and in alternating currents of varying frequencies. It was found to decrease at a rate of $4.7\times10^{-3}$ ohm-seconds per cycle in the range of 1,000 to 20,000 cycles per second, the variation being shown in the graph of Figure 4. This method permits one to measure the frequency of an applied alternating current by measuring the resistance of a calibrated resin rod.

EXAMPLE 8

Continuous ion-exchange between two electrolytes

| | Parts |
|---|---|
| Sulfuric acid (97%) | 108 |
| Phenol | 100 |
| Formaldehyde (37% in water) | 130 |

The phenol and sulfuric acid were mixed together and heated at 120° C. for four hours, cooled to 15° C. and added to the formaldehyde which had been cooled to 0° C. Additional cooling was provided to keep the temperature below 20° C. The mixture may be stored for weeks at 5° C. without excessive polymerization.

A rod was made of this material by pouring it into a cylindrical glass mold and curing at 60° C. until solid and dark in color. The resulting resin cylinder was drilled out on a lathe to give a tube 4.5 cm. long, 0.9 cm. outside diameter and 0.3 cm. inside diameter. This tube was mounted in a glass cell. A solution of 0.02 N $CaCl_2$ was circulated through the inside of the tube at 12.5 cc./min. for 24 hours and a solution of 0.2 N NaCl on the outside at 2.5 cc./min. for 24 hours. Transfer of cations took place almost to the exclusion of anions.

A reinforced diaphragm was made by impregnating Vinyon filter cloth with unpolymerized exchanger and curing at 110° C. for 10 minutes in a moisture saturated atmosphere. The resulting diaphragm was suitably mounted in a glass vessel to give a vertical partition. A 0.1 N $CaCl_2$ solution was put in one compartment and a 0.1 N $KNO_3$ solution in the other. The rate of exchange of calcium ions between solutions was $1.6\times10^{-2}$ mg. per ft. hour. This was considerably greater than the rate of exchange of chloride ions which was $2.5\times10^{-3}$ mg. per ft. hour.

EXAMPLE 9

Application of ion exchange diaphragms to the sodium chloride electrolysis cell

| Preparation of ion-exchange diaphragm: | Parts |
|---|---|
| Sulfuric acid (95.5%) | 141 |
| Phenol | 115 |
| Formaldehyde (37% in water) | 180 |

The sulfuric acid was added to the phenol at 95° C. and the mixture heated at 140° C. for two hours and cooled to room temperature. The formaldehyde was cooled to 0° C. and the mixture of phenol and sulfuric acid added, additional cooling being provided to keep the temperature of the mixture below 20° C. The temperature was then reduced to 5° C., at which temperature the mixture may be stored for weeks without polymerization. The mixture was a viscous, oily liquid of reddish-amber color.

Figure 2:
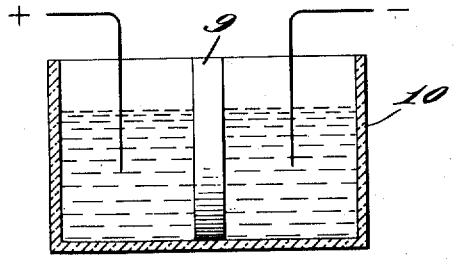
Fig. 2 is an elevational diagrammatic cross-section of a cell containing a diaphragm of the ion-exchange material therein as a separator or barrier between two electrolyte solutions.

The mixture was poured into a cylindrical glass mold and heated at 50° C. until solid and dark in color. The resulting resin cylinder was sawed into disks, and the disks were washed in distilled water until the wash water was sulfate free and one of the disks 9 was then used in an electrolysis cell 10 diagrammatically shown in Fig. 2.

The diaphragm was 0.3 cm. in thickness with an area of 0.7 cm.$^2$. The anolyte was a saturated NaCl solution, the catholyte 25 cc. of 0.16 N NaOH, the current 20 milliamperes at 6 volts.

At the end of 24 hours there was no chloride in the catholyte (silver nitrate test) and the concentration of NaOH in a total volume of 22 cc. was then 1.52 N.

We have found the conductance of this cast phenolsulfuric acid formaldehyde diaphragm to be $33\times10^{-2}$ ohms$^{-1}$ cm.$^{-1}$.

Hence, this cell is superior to the conventional diaphragm caustic cell in producing chloride free caustic. It is superior to the mercury cell in producing chloride free caustic in that it involves no mercury.

EXAMPLE 10

Permselective diaphragms in the construction of primary electric cells

Preparation of the diaphragm:

| | Parts |
|---|---|
| Triamino triazine (melamine) | 126 |
| Guanidine carbonate | 90 |
| Hydrochloric acid (37% in water) | 135 |
| Formaldehyde (37% in water) | 300 |

The guanidine carbonate and triamino triazine (melamine) were mixed together and the hydrochloric acid added and then the formaldehyde. A piece of Vinyon cloth was impregnated in the warmed unpolymerized mixture and cured at 110° C. for 10 hours. The polymer was colorless and transparent. The impregnated cloth was converted to the sulfate form by soaking in an excess of 0.5 N $Na_2SO_4$ solution, the excess solution was removed and the diaphragm then mounted as a vertical partition in a glass vessel. One compartment was filled with a saturated solution of zinc sulfate and the other with a saturated solution of copper sulfate. A zinc plate was immersed in the zinc sulfate solution and a copper plate in the copper sulfate solution. After four days there was no visible coating of copper on the zinc electrode. The area of the diaphragm was 6 square inches and the thickness was 0.04 inch. The open circuit voltage at 22° C. was 1.050 volts and did not vary more than 2% in the range −8° C. to 25° C. The internal resistance of the cell was 24 ohms at 22° C. The internal resistance of the cell was decreased to 7 ohms by substituting cupric and zinc chlorides with a diaphragm conditioned with 0.5 N NaCl. This type of cell is commonly referred to as a Daniel cell.

We claim:

1. As an article of manufacture, a solid unfractured structure having at least two dimensions each in excess of 0.25 inch, and comprising as an essential part extending substantially throughout said structure, a predominant amount of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-5}$ and being present in an amount of at least 0.3 milliequivalent per gram of dry resin, and said water being present in an amount of at least 15% of the weight of the dry resin.

2. As an article of manufacture, a solid unfractured sheet having two dimensions each in excess of 0.25 inch, and comprising as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-5}$ and being present in an amount of at least 0.3 milliequivalent per gram of dry resin, and said water being present in an amount of at least 15% of the weight of the dry resin.

3. As an article of manufacture, a solid unfractured *membrane* [structure] having at least two dimensions each in excess of 0.25 inch, and comprising as an essential part extending substantially throughout said *membrane* [structure], a predominant amount of an ion exchange resin which comprises: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 15 percent of the weight of the dry resin.

4. The article defined by claim 3 wherein the water is present in an amount of at least 25 percent of the weight of dry resin.

5. As an article of manufacture, a solid unfractured structure having at least two dimensions each in excess of 0.25 inch, and comprising as an essential part extending substantially throughout said structure, a predominant amount of a homogeneous continuous phase of an ion exchange resin which comprises: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalent per gram of dry resin when K is between $10^{-5}$ and $10^{-3}$ and in an amount of at least 0.3 milliequivalent per gram of dry resin when K is $10^{-3}$ or greater; and said water being present in an amount of at least 15 percent of the weight of the dry resin.

6. The article defined by claim 5 wherein the water is present in an amount of at least 25 percent of the weight of dry resin.

7. As an article of manufacture, a solid unfractured sheet having two dimensions each in excess of 0.25 inch, and comprising as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 15 percent of the weight of the dry resin.

8. The article defined by claim 7 wherein the ion exchange resin is a homogeneous continuous phase.

9. The article defined by claim 8 wherein the water is present in an amount of at least 25 percent of the weight of dry resin.

10. The article defined by claim 7 wherein the water is present in an amount of at least 25 percent of the weight of dry resin.

11. As an article of manufacture, a solid unfractured sheet having two dimensions each in excess of 0.25 inch, and comprising in combination a reinforcing web and as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 15 percent of the weight of dry resin.

12. The article defined by claim 11 wherein the ion exchange resin is a homogeneous continuous phase.

13. The article defined by claim 12 wherein the water is present in an amount of at least 25 percent of the weight of dry resin.

14. The article defined by claim 11 wherein the water is present in an amount of at least 25 percent of the weight of dry resin.

15. As an article of manufacture, a solid unfractured sheet having two dimensions each in excess of 0.25 inch, and comprising as an essential part extending substantially throughout said sheet, a predominant amount of a homogeneous continuous phase of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-5}$ and being present in an amount of at least 0.3 milliequivalent per gram of dry resin, and said water being present in an amount of at least 15% of the weight of the dry resin.

16. As an article of manufacture, a solid unfractured [structure] *membrane* having at least two dimensions each in excess of 0.25 inch, and comprising as an essential part extending substantially throughout said [structure]

*membrane*, a predominant amount of particles of an ion exchange resin, and an insoluble binder therefor, said resin comprising: an insobluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 25 percent of the weight of the dry resin.

17. The article defined by claim 16 wherein the binder is a non-conducting material.

18. As an article of manufacture, a solid unfractured sheet having two dimensions each in excess of 0.25 inch, and comprising as an essential part extending substantially throughout said sheet, a predominant amount of particles of an ion exchange resin, and an insoluble binder therefor, said resin comprising: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 25 percent of the weight of the dry resin.

19. The article defined by claim 18 wherein the binder is a non-conducting material.

20. As an article of manufacture, a solid unfractured structure having at least two dimensions each in excess of 0.25 inch, and comprising as an essential part extending substantially throughout said structure, a predominant amount of the combination of particles of an ion exchange resin and a binder which is an ion exchange resin, each of said exchange resins comprising: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 25 percent of the weight of the dry resin.

21. As an article of manufacture, a solid unfractured sheet having two dimensions each in excess of 0.25 inch, and comprising as an essential part extending substantially throughout said sheet, a predominant amount of the combination of particles of an ion exchange resin and a binder which is an ion exchange resin, each of said exchange resins comprising: an insoluble infusible synthetic organic polymeric matrix, dissociable ionic groups chemically bonded to said matrix, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; and said water being present in an amount of at least 25 percent of the weight of the dry resin.

22. As an article of manufacture, a solid unfractured structure having at least two dimensions each in excess of 0.25 inch, and comprising as an essential part extending substantially throughout said structure, a predominant amount of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-3}$ and being present in an amount of at least 0.8 milliequivalent per gram of dry resin, and said water being present in an amount between about 58 and 138 percent of the weight of the dry resin.

23. As an article of manufacture, a solid unfractured sheet having two dimensions each in excess of 0.25 inch, and comprising as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-3}$ and being present in an amount of at least 0.8 milliequivalent per gram of dry resin, and said water being present in an amount between about 58 and 138 percent of the weight of the dry resin.

24. As an article of manufacture, a solid unfractured structure having at least two dimensions each in excess of 0.25 inch, and comprising as an essential part extending substantially throughout said structure, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

25. The article defined by claim 24 wherein the ion exchange resin is a homogeneous continuous phase.

26. As an article of manufacture, a solid unfractured sheet having two dimensions each in excess of 0.25 inch, and comprising as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

27. The article defined by claim 26 wherein the ion exchange resin is a homogeneous continuous phase.

28. As an article of manufacture, a solid unfractured sheet having two dimensions each in excess of 0.25 inch, and comprising in combination a reinforcing web and as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

29. The article defined by claim 28 wherein the ion exchange resin is a homogeneous continuous phase.

30. As an article of manufacture, a solid unfractured structure having at least two dimensions each in excess of 0.25 inch, and comprising as an essential part extending substantially throughout said structure, a predominant amount of particles of an ion exchange resin, and an insoluble binder therefor, said resin comprising: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 precent of the weight of dry resin.

31. The article defined by claim 30 wherein the binder is a non-conducting material.

32. As an article of manufacture, a solid unfractured sheet having two dimensions each in excess of 0.25 inch, and comprising as an essential part extending substantially throughout said sheet, a predominant amount of particles of an ion exchange resin, and an insoluble binder therefor, said resin comprising: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

33. The article defined by claim 32 wherein the binder is a non-conducting material.

34. As an article of manufacture, a solid unfractured structure having at least two dimensions each in excess of 0.25 inch, and comprising as an essential part extending substantially throughout said structure a predominant amount of the combination of particles of an ion exchange resin and a binder which is an ion exchange, resin, each of said exchange resins comprising: an insoluble infusible synthetic organic polymeric mixture, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

35. As an article of manufacture, a solid unfractured sheet having two dimensions each in excess of 0.25 inch, and comprising as an essential part extending substantially throughout said sheet, a predominant amount of the combination of particles of an ion exchange resin and a binder which is an ion exchange resin, each of said exchange resins comprising: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.8 milliequivalent per gram of dry resin; and said water being present in an amount between about 58 and 138 percent of the weight of dry resin.

36. As an article of manufacture, a solid unfractured structure having at least two dimensions each in excess of 0.25 inch, and comprising as an essential part extending substantially throughout said structure, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.3 milliequivalent per gram of dry resin; and said water being present in an amount of at least 25 percent of the weight of dry resin.

37. As an article of manufacture, a solid unfractured sheet having two dimensions each in excess of 0.25 inch, and comprising as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.3 milliequivalent per gram of dry resin; and said water being present in an amount of at least 25 percent of the weight of dry resin.

38. As an article of manufacture, a solid unfractured sheet having two dimensions each in excess of 0.25 inch, and comprising in combination a reinforcing web and as an essential part extending substantially throughout said sheet, a predominant amount of an ion exchange resin which comprises: an insoluble infusible synthetic organic polymeric matrix, dissociable ionic groups chemically bonded to said matrix, and water in gel relationship with said matrix; said groups being selected from the class consisting of sulfonate, quaternary ammonium, guanidyl, and dicyandiamindino, said groups being present in an amount of at least 0.3 milliequivalent per gram of dry resin; and said water being present in an amount of at least 25 percent of the weight of dry resin.

39. As an article of manufacture, a solid unfractured sheet having two dimensions each in excess of 0.25 inch, and comprising as an essential part extending substantially throughout said sheet, a predominant amount of particles of an ion exchange resin, and an insoluble binder therefor, said resin comprising: an insoluble infusible synthetic organic polymer matrix, dissociable ionic groups chemically bonded to said matrix, and water in gel relationship with said matrix; said groups being selected from the class consisting of sulfonate, quaternary ammonium, guanidyl, and dicyandiamidino, said groups being present in an amount of at least 0.3 milliequivalent per gram of dry resin; and said water being present in an amount of at least 25 percent of the weight of dry resin.

40. The article defined by claim 26 wherein the ion exchange resin is a phenol sulfonate-aldehyde condensation product.

41. The article defined by claim 29 wherein the ion exchange resin is a phenol sulfonate-aldehyde condensation product.

42. The article defined by claim 26 wherein the ion exchange resin is a sulfonated copolymer of styrene and divinyl benzene.

43. The article defined by claim 37 wherein the ion exchange resin is a sulfonated copolymer of styrene and divinyl benzene.

44. The article defined by claim 32 wherein the ion exchange resin is a sulfonated copolymer of styrene and divinyl benzene.

45. The article defined by claim 39 wherein the ion exchange resin is a sulfonated copolymer of styrene and divinyl benzene.

46. The article defined by claim 26 wherein the ion exchange resin comprises a copolymer of styrene and divinylbenzene having quaternary ammonium groups bonded to the aromatic nuclei.

47. The article defined by claim 37 wherein the ion exchange resin comprises a copolymer of styrene and divinylbenzene having quaternary ammonium groups bonded to the aromatic nuclei.

48. The article defined by claim 32 wherein the ion exchange resin comprises a copolymer of styrene and divinylbenzene having quaternary ammonium groups bonded to the aromatic nuclei.

49. The article defined by claim 39 wherein the ion exchange resin comprises a copolymer of styrene and divinylbenzene having quaternary ammonium groups bonded to the aromatic nuclei.

50. The article defined by claim 10 wherein the polymeric matrix comprises a copolymer of styrene and divinylbenzene.

51. The article defined by claim 26 wherein the ion exchange resin is a melamine guanidine condensation product.

52. In the method of forming a solid unfractured structure having at least two dimensions each in excess of 0.25 inch, and comprising as an essential part extending substantially throughout said structure a predominant amount of an ion exchange resin which comprises: an insoluble infusible synthetic organic polymeric matrix, dissociable ionic groups chemically bonded to said matrix, and water in gel relationship with said matrix; said groups having a dissociation constant of at least $10^{-5}$ and being present in an amount of at least 0.3 milliequivalent per gram of dry resin, and said water being present in an amount of at least 15% of the weight of dry resin, the step of forming said solid structure under conditions substantially preventive of the escape of water.

53. The method of forming a solid unfractured structure having at least two dimensions each in excess of 0.25 inch, and comprising as an essential part extending substantially throughout said structure a predominant amount of an ion exchange resin, comprising the steps of: forming an aqueous dipersion of material polymerizable into an ion exchange resin which comprises an insoluble, infusible synthetic organic polymeric matrix and dissociable ionic groups chemically bonded to said matrix, said groups having a dissociation constant in excess of $10^{-5}$ and being present in the amount of at least 0.3 milliequivalent per gram of dry resin said dispersion containing water in an amount of at least 15% of the weight of dry resin; and polymerizing said material to the insoluble infusible stage under conditions substantially preventive of the escape of water from said dispersion.

54. The method of forming a solid unfractured structure having at least two dimensions each in excess of 0.25 inch, and comprising as an essential part extending substantially throughout said structure a predominant amount of an ion exchange resin, comprising the steps of: forming an aqueous dispersion of material polymerizable into an ion exchange resin which comprises an insoluble infusible synthetic organic polymeric matrix and dissociable ionic groups chemically bonded to said matrix, said groups having a dissociation constant (K) in excess of $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater; said dispersion containing water in an amount of at least 25% of the weight of dry resin; casting said dispersion to the desired form; and polymerizing said material to the insoluble infusible stage under conditions substantially preventive of the escape of water from said dispersion.

55. The method of forming a solid unfractured structure having at least two dimensions each in excess of 0.25 inch, and comprising as an essential part extending substantially throughout said structure a predominant amount of an ion exchange resin, comprising the steps of: forming an aqueous dispersion of material polymerizable into an ion exchange resin which comprises an insoluble infusible synthetic organic polymeric matrix and dissociable ionic groups chemically bonded to said matrix, said groups being selected from the class consisting of sulfonate, quaternary ammonium, guanidyl, and dicyandiamidino, said groups being present in a concentration of at least 0.8 milliequivalent per gram of dry resin, said dispersion containing water in an amount between about 58 and 138 percent of the weight of dry resin; casting said dispersion to the desired form; and polymerizing said material to the insoluble infusible stage under conditions substantially preventive of the escape of water from said dispersion.

56. The method of forming a solid unfractured structure having at least two dimensions each in excess of 0.25 inch, and comprising as an essential part extending substantially throughout said structure a predominant amount of an ion exchange resin, comprising the steps of: combining with a binder a predominant amount of particles of an ion exchange resin which comprises an insoluble infusible synthetic organic polymeric matrix, dissociable ionic groups chemically bonded to said matrix, and water in gel relationship with said matrix, said groups having a dissociation constant (K) of at least $10^{-5}$, said groups being present in an amount of at least 0.3 milliequivalent per gram of dry resin when K is $10^{-3}$ or greater, and said water being present in an amount of at least 25% of the weight of dry resin; and forming said structure under conditions substantially preventive of the escape of water.

57. The method of forming a solid unfractured structure having at least two dimensions each in excess of 0.25 inch, and comprising as an essential part extending substantially throughout said structure a predominant amount of an ion exchange resin, comprising the steps of: combining particles of an ion exchange resin with an aqueous dispersion of material polymerizable into an ion exchange resin, each of said resins comprising an insoluble infusible synthetic organic polymeric matrix, dissociable ionic groups chemically bonded to said matrix, and water in gel relationship with said matrix, said groups having a disassociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$, or greater and said water being present in an amount of at least 25% of the weight of dry resin; casting said mixture to the desired form; and polymerizing the dispersed material to the water insoluble infusible stage under conditions substantially preventive of the escape of water.

58. In an electrolytic system, a pair of compartments, a barrier separating said compartments, and electrical contacting means communicating with the interior of each of said compartments, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant greater than $10^{-5}$ and being present in an amount of at least 0.3 milliequivalent per gram of dry resin, and said water being present in an amount of at least 15% of the weight of dry resin.

59. In an electrolytic system, a pair of compartments, a barrier separating said compartments, and electrical contacting means communicating with the interior of each of said compartments, said barrier comprising as an essential part extending substantially throughout, a predominant amount of an ion sxchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at least 0.3 milliequivalent per gram of dry resin for groups having a K of $10^{-3}$ or higher; and said water being present in an amount of at least 25% of the weight of dry resin.

60. The system defined by claim 59 wherein the ion exchange resin is a homogeneous continuous phase.

61. An electrodialysis cell comprising a pair of compartments, a barrier separating said compartments and electrical contacting means communicating with the interior of each of said compartments, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at least 0.3 milliequivalent per gram of dry resin for groups having a K of $10^{-3}$ or higher; and said water being present in an amount of at least 25% of the weight of dry resin.

62. An electrodialysis cell comprising a pair of compartments, a barrier separating said compartments and electrical contacting means communicating with the interior of each of said compartments, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups being selected from the class consisting of sulfonate, quaternary ammonium, guanidyl and dicyandiamidino and being present in an amount of at least 0.8 milliequivalent per gram of dry resin, and said water being present in an amount of between about 58 and 138 percent of the weight of dry resin.

63. An electrodialysis cell comprising an anode compartment and a first electrode therein, a cathode compartment and a second electrode therein, and a barrier separating said compartments, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at at least 0.3 milliequivalent per gram of dry resin for groups having a K of $10^{-3}$ or higher; and said water being present in an amount of at least 25% of the weight of dry resin.

64. An electrodialysis cell comprising an anode compartment and a first electrode therein, a cathode compartment and a second electrode therein, and a barrier separating said compartments, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups being selected from the class consisting of sulfonate, quaternary ammonium, guanidyl and dicyandiamidino and being present in an amount of at least 0.8 milliequivalent per gram of dry resin, and said water being present in an amount of between about 58 and 138 percent of the weight of dry resin.

65. In an electromotive cell adapted to provide a source of electromotive force between a pair of electrodes, a barrier between said electrodes, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at least 0.3 milliequivalent per gram of dry resin for groups having a K of $10^{-3}$ or higher; and said water being present in an amount of at least 25% of the weight of dry resin.

66. In an electromotive cell adapted to provide a source of electromotive force between a pair of electrodes, a barrier between said electrodes, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups being selected from the class consisting of sulfonate, quaternary ammonium, guanidyl and dicyandiamidino and being present in an amount of at least 0.8 milliequivalent per gram of dry resin, and said water being present in an amount of between about 58 and 138 percent of the weight of dry resin.

67. In a Daniel cell, a barrier separating the two solutions, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at least 0.3 milliequivalent per gram of dry resin for groups having a K of $10^{-3}$ or higher; and said water being present in an amount of at least 25% of the weight of dry resin.

68. In a Daniel cell, a barrier separating the two solutions, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups being selected from the class consisting of sulfonate, quaternary ammonium, guanidyl and dicyandiamidino and being present in an amount of at least 0.8 milliequivalent per gram of dry resin, and said water being present in an amount of between about 58 and 138 percent of the weight of dry resin.

69. A method of transferring ions of one charge from one electrolytic solution to another to the substantial exclusion of ions of the other charge comprising separating said solutions by means of a barrier and passing a direct electric current in series across said solutions and separating barrier, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant greater than $10^{-5}$ and being present in an amount of at least 0.3 milliequivalent per gram of dry resin, and said water being present in an amount of at least 15% of the weight of dry resin.

70. A method of transferring ions of one charge from one electrolytic solution to another to the substantial exclusion of ions of the other charge comprising separating said solutions by means of a barrier and passing a direct electric current in series across said solutions and separating barrier, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups having a dissociation constant (K) greater than $10^{-5}$, said groups being present in an amount of at least 3.0 milliequivalents per gram of dry resin for groups having a K between $10^{-5}$ and $10^{-3}$ and in an amount of at least 0.3 milliequivalent per gram of dry resin for groups having a K of $10^{-3}$ or higher; and said water being present in an amount of at least 25% of the weight of dry resin.

71. A method of transferring ions of one charge from one electrolytic solution to another to the substantial exclusion of ions of the other charge comprising separating said solutions by means of a barrier and passing a direct electric current in series across said solutions and separating barrier, said barrier comprising as an essential part extending substantially throughout, a predominant amount of an ion exchange resin which comprises: an insoluble infusible synthetic organic polymeric matrix, dissociable ionic groups chemically bonded to said matrix and water in gel relationship with said matrix; said groups being selected from the class consisting of sulfonate, quaternary ammonium, guanidyl and dicyandiamidino and being present in an amount of at least 0.8 milliequivalent per gram of dry resin, and said water being present in an amount of between about 58 and 138 percent of the weight of dry resin.

72. The method of electrolyzing aqueous solutions of sodium chloride to produce a sodium hydroxide solution and chlorine, comprising contacting the solution of sodium chloride with an anode and one side of the barrier, contacting the sodium hydroxide solution with a cathode and the other side of the barrier, and passing an electric current between the anode and cathode, said barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix, and water in gel relationship with said matrix; said ionic groups having a dissociation constant (K) of at least $10^{-5}$, said ionic groups being present in an amount of at least 3.0 milliequivalents per gram of dry resin for groups having a K between $10^{-5}$ and $10^{-3}$, and in amount of at least 0.3 milliequivalent per gram of dry resin for groups having a K of $10^{-3}$ or above; and said water being present in an amount of at least 25% of the weight of dry resin.

References Cited in the file of this patent or the original patent

UNITED STATES PATENTS

| | | |
|---|---|---|
| 461,965 | Souther | Oct. 27, 1891 |
| 665,625 | Amwake | Jan. 8, 1901 |
| 1,176,541 | Gibbs | Mar. 21, 1916 |
| 1,284,618 | Dow | Nov. 12, 1918 |
| 1,557,931 | Grossmann | Oct. 20, 1925 |
| 1,926,063 | Rossiter et al. | Sept. 12, 1933 |
| 1,931,954 | Childs | Oct. 24, 1933 |
| 1,998,539 | Gams et al. | Apr. 23, 1935 |
| 2,195,196 | Wassenegger et al. | Mar. 26, 1940 |
| 2,204,539 | Wassenegger et al. | June 11, 1940 |
| 2,228,159 | Wassenegger et al. | Jan. 7, 1941 |
| 2,297,837 | Loughnane | Oct. 6, 1942 |
| 2,341,907 | Cheetham et al. | Feb. 15, 1944 |
| 2,395,825 | Hesler | Mar. 5, 1946 |
| 2,434,190 | Barnes | Jan. 6, 1948 |
| 2,448,029 | Huested et al. | Aug. 31, 1948 |
| 2,452,624 | Zimmermann | Nov. 2, 1948 |
| 2,500,113 | Banks | Mar. 7, 1950 |
| 2,500,149 | Boyer | Mar. 14, 1950 |
| 2,546,938 | Bauman | Mar. 27, 1951 |
| 2,593,540 | Cornwell et al. | Apr. 22, 1952 |
| 2,614,976 | Patnode | Oct. 21, 1952 |

FOREIGN PATENTS

| | | |
|---|---|---|
| 713,093 | Germany | Oct. 9, 1941 |

OTHER REFERENCES

"Primary Batteries," by Cooper, second impression (1920), pages 235, 236.

"Modern Plastics," October 1945, pages 149, 150 and 218.

"Ion Exchange," by Nachod (1949), pages 48–50, 62–64 and 67.

"Transactions of The Faraday Society," vol. 33 (1937), pages 1073–1081.

"Helvetica Chimica Acta," vol. 23 (1940), pages 795–800.